US011008489B2

(12) United States Patent
Schaekens et al.

(10) Patent No.: US 11,008,489 B2
(45) Date of Patent: *May 18, 2021

(54) NON-REACTIVE HOT-MELT ADHESIVE WITH SPECIFIC RESIN

(71) Applicant: PURAC BIOCHEM BV, Gorinchem (NL)

(72) Inventors: Chris Francois Hubert Schaekens, Gorinchem (NL); Gerrit Gobius Du Sart, Gorinchem (NL); Kevin Bernardus Braam, Gorinchem (NL)

(73) Assignee: PURAC BIOCHEM BV, Gorinchem (NL)

( * ) Notice: Subject to any disclaimer, the term of this patent is extended or adjusted under 35 U.S.C. 154(b) by 418 days.

This patent is subject to a terminal disclaimer.

(21) Appl. No.: 15/762,773

(22) PCT Filed: Sep. 8, 2016

(86) PCT No.: PCT/EP2016/071143
§ 371 (c)(1),
(2) Date: Mar. 23, 2018

(87) PCT Pub. No.: WO2017/055045
PCT Pub. Date: Apr. 6, 2017

(65) Prior Publication Data
US 2020/0216727 A1    Jul. 9, 2020

(30) Foreign Application Priority Data
Oct. 1, 2015  (EP) .................................. 15187977

(51) Int. Cl.
*C09J 167/04* (2006.01)
*C08L 67/04* (2006.01)
*C09J 7/35* (2018.01)
*C08G 63/08* (2006.01)
*C09J 5/06* (2006.01)
*C09J 5/00* (2006.01)
*C09J 167/02* (2006.01)

(52) U.S. Cl.
CPC ............ *C09J 167/04* (2013.01); *C08G 63/08* (2013.01); *C08L 67/04* (2013.01); *C09J 5/00* (2013.01); *C09J 5/06* (2013.01); *C09J 7/35* (2018.01); *C09J 167/02* (2013.01); *C09J 2301/304* (2020.08); *C09J 2467/00* (2013.01)

(58) Field of Classification Search
CPC ...................................................... C09J 167/04
See application file for complete search history.

(56) References Cited

U.S. PATENT DOCUMENTS 5,180,765 A * 1/1993 Sinclair .................. A61L 15/26
524/306
5,252,642 A 10/1993 Sinclair et al.
5,312,850 A * 5/1994 Iovine ..................... C08L 93/04
524/47
5,700,344 A * 12/1997 Edgington ............. C08G 63/08
156/336
5,753,724 A 5/1998 Edgington et al.
5,952,405 A * 9/1999 Schoenberg ........... C09J 167/04
524/81
10,407,599 B2 * 9/2019 Schaekens ............. C09J 167/04
2004/0143072 A1 * 7/2004 Lewis ..................... C08G 63/06
525/417
2004/0220355 A1 * 11/2004 Whitehouse ............. C09J 7/381
525/436
2009/0234042 A1   9/2009 Luinstra
2010/0093888 A1 * 4/2010 Endo ........................ C08K 5/29
523/124
2015/0191635 A1 * 7/2015 Terfloth ................ C08K 5/0016
156/71
2016/0304751 A1 * 10/2016 Mussig ................... B32B 37/12
2017/0037218 A1 * 2/2017 Kadoma ................... C08K 5/10
2017/0081572 A1 * 3/2017 Schaekens ................ C09J 5/00
2018/0282599 A1 * 10/2018 Schaekens ............. C09J 167/02

FOREIGN PATENT DOCUMENTS

JP    H05-339557 A    12/1993
WO   2005/056680 A1   6/2005
WO   2008/044651 A1   4/2008

OTHER PUBLICATIONS

Machine Translation of WO 2008/044651, 2020 (Year: 2020).*
Oct. 10, 2016 International Search Report issued in International Patent Application No. PCT/EP2016/071143.
Oct. 10, 2016 Written Opinion issued in International Patent Application No. PCT/EP2016/071143.
Nov. 21, 2016 International Search Report issued in International Patent Application No. PCT/EP2016/071142.
Nov. 21, 2016 Written Opinion issued in International Patent Application No. PCT/EP2016/071142.
U.S. Appl. No. 15/762,719, filed Mar. 23, 2018 in the name of Chris Francois Hubert Schaekens et al.
Mar. 23, 2020 Office Action issued in Chinese Patent Application No. 201680055057.9.
Shufen Zou. "Cold Crystallization and Related Factors of Polylactides With Different Chiral Structure". Masters Thesis, East China University of Technology, 2012.
"Encyclopedia of Chinese Shoe Industry (Part I), Materials, Standards, and Information". First Edition, Chemical Industry Press, pp. 317.
Feb. 19, 2019 Office Action issued in Japanese Patent Application No. 2018-515848.

* cited by examiner

Primary Examiner — Liam J Heincer
(74) Attorney, Agent, or Firm — Oliff PLC

(57) ABSTRACT

The invention pertains to a non-reactive hot-melt adhesive comprising 10-90 wt. %, calculated on the weight of the adhesive, of amorphous thermoplastic resin which is compatible with polylactic acid, wherein the amorphous thermoplastic resin is a random copolymer of lactic acid and further reactive monomer, 10-90 wt. %, calculated on the weight of the adhesive, of a polylactic acid polymer unit (PLAU) selected from poly-L-lactic acid (PLLAU) and poly-D-lactic acid (PDLAU), the unit having a number average molecular weight of at least 0.75 kg/mol.

15 Claims, No Drawings

NON-REACTIVE HOT-MELT ADHESIVE WITH SPECIFIC RESIN

The invention relates to a non-reactive hot-melt adhesive comprising a specific resin. The invention also pertains to a method for the manufacture of such non-reactive hot-melt adhesive, and its use.

As used herein, "hot-melt adhesive" refers to a thermoplastic polymer composition that is heated to obtain a liquid of flowable viscosity, and after application to a substrate, cooled to obtain a solid. After the hot-melt adhesive solidifies upon cooling to a temperature below its melt temperature or below its solidification transition temperature, an adhesive bond is formed between the substrate and the adhesive material. As essentially no chemical bonds are formed between the adhesive and the substrate upon which the adhesive is applied, the hot-melt adhesive may be referred to as a non-reactive hot-melt adhesive.

Hot-melt adhesives are often used to bond two substrates together so as to maintain the two substrates in a fixed relation to each other. Hot-melt adhesives are also used in articles that include a nonwoven layer to bond the nonwoven layer and a polymer film layer together. Hot-melt adhesives are further used to adhere packaging constructions e.g. bag, box, carton, case and tray together to construct the package, close the package or both. They are also used as pressure-sensitive adhesives for tapes and labels.

U.S. Pat. No. 5,753,724 describes a hot-melt adhesive composition comprising a polylactic acid polymer and a resin grade or high molecular weight thermoplastic polyester, which is, e.g., a thermoplastic polyester urethane, a polylactic acid resin or a PHBV thermoplastic resin.

WO2008/044651 describes a biodegradable polylactic acid-based adhesive containing a polylactic acid resin composition which is substantially composed of a crystalline polylactic acid, a non-crystalline polylactic acid and a plasticizer.

WO2005/056680 describes a biodegradable hot-melt adhesive for use in medical applications, which has a melting point in the range of 57-100° C. and which is based on polymer blends consisting of caprolactone copolymers or caprolactone copolymers and polycaprolactone.

US2009/0234042 describes transparent blends of polypropylene carbonate with polylactic acid. The blends are used, e.g., in packaging in the form of foams or solid or rigid films. Use as an adhesive is not described.

U.S. Pat. No. 5,252,642 describes a degradable impact modified polylactic acid which comprises a blend of a physical mixture of polylactic acid and blend-compatible elastomer. Lactic acid, lactide, and lactic acid oligomers may be added as plasticizers. The compositions are processed by melt-processing to form disposable polymer articles.

A non-reactive hot-melt adhesive has to meet a number of requirements to be suitable for commercial application.

In the first place, as will be evident, the adhesion properties of the adhesive upon use have to be good. Loss of adhesion can cause, e.g., opening of packages, which is unacceptable both during and after production.

Further, hot-melt adhesives are conventionally provided in the form of granules, which will be molten before use. These granules have to be stable during storage. That is, the granules cannot adhere to each other to a too large extent, as this will impede proper handling of the granules. To obtain this feature, it is important to ensure that the hot-melt adhesive does not show flow at room temperature.

A further important property of a hot-melt adhesive is the set time, that is, the time required by the adhesive to form a bond with the substrate. The set time is important in commercial operation, because it governs the time required to press the two substrates sandwiching the adhesive together. Set time may be of the order of seconds.

On the other hand, while the set time often has to be very short, the adhesive has to show some open time. The open time is the time after application of the adhesive at high temperature during which the adhesive still has flow properties. This is the time frame after application of the adhesive onto the carrying substrate during which the covering substrate can be applied while obtaining good adhesion.

A further property which may be desirable for hot-melt adhesives is a certain degree of biodegradability. Where the hot-melt adhesive is used in the manufacture of objects which are to be composted, it is important that the adhesive can be degraded within the same time frame as the rest of the object. This feature may be of particular relevancy where the hot-melt adhesive is used in the manufacture of packaging material.

Further, it is preferred for the hot-melt adhesive to be at least partially derivable from renewable resources.

There is need in the art for a non-reactive hot-melt adhesive which combines a good adhesive performance with a good storage stability resulting from a low cold-flow, and in some embodiments a short set time, wherein the adhesive is at least partially based on polymers which can be prepared from renewable resources. The present invention provides such an adhesive.

The present invention provides a non-reactive hot-melt adhesive comprising 10-90 wt. %, calculated on the weight of the adhesive, of amorphous thermoplastic resin which is compatible with polylactic acid, wherein the amorphous thermoplastic resin is a random copolymer of lactic acid and further reactive monomer, 10-90 wt. %, calculated on the weight of the adhesive, of a polylactic acid polymer unit (PLAU) selected from poly-L-lactic acid (PLLAU) and poly-D-lactic acid (PDLAU), the unit having a number average molecular weight of at least 0.75 kg/mol.

The hot-melt adhesive of the present invention comprises PLA which can be derived from renewable resources. Further, PLA is biodegradable, and, depending on the nature of the amorphous thermoplastic resin and the other components in the composition, a fully biodegradable composition may be obtained. Further, the adhesive combines a good adhesive performance with a good storage stability resulting from a low cold-flow, and may have a short set time. Further advantages of the present invention and specific embodiments thereof will become apparent from the further specification.

The non-reactive hot-melt adhesive of the present invention comprises a polylactic acid polymer unit (PLAU).

Within the context of the present specification, the term polylactic acid polymer unit (PLAU) refers to a polymer unit comprising at least 90 wt. % of lactic acid monomers, in particular at least 95 wt. %, more in particular at least 98 wt. % of lactic acid monomers. The lactic acid monomers in the PLAU may originate from lactic acid itself but are preferably obtained from lactide, the cyclic dimer of lactic acid. It is well-known to use lactide in the production of polylactic acid (co)polymers, by means of ring-opening polymerization techniques.

Within the context of the present specification, a poly-L-lactic acid unit (PLLAU) is defined as a PLAU in which at least 90% of the lactic acid monomers are L-lactic acid monomers, in particular at least 95%, more in particular at least 98%. Conversely, within the context of the present specification, a poly-D-lactic acid unit (PDLAU) is defined as a PLAU in which at least 90% of the lactic acid monomers are D-lactic acid monomers, in particular at least 95%, more in particular at least 98%. For the effect of the present invention, higher percentages are preferred as it is believed that combining units with a higher stereochemical purity leads to improved set times.

As indicated above, the non-reactive hot-melt adhesive composition comprises 10-90 wt. %, preferably 30-70 wt. % and more preferably 40-60 wt. %, calculated on the weight of the adhesive, of a polylactic acid polymer unit (PLAU) with a number average molecular weight of at least 0.75 kg/mol. This PLAU will in the following also be indicated as the first PLAU, as the composition can in some embodiments also contain a second PLAU.

Therefore, in one embodiment, the hot-melt adhesive according to the invention further comprises 0.5-20 wt. % calculated on the weight of the first PLAU, of a second polylactic acid polymer unit (PLAU) selected from poly-L-lactic acid (PLLAU) and poly-D-lactic acid (PDLAU), the unit having a number average molecular weight of at least 0.75 kg/mol, wherein when the first PLAU is PLLAU, the second PLAU is PDLAU and when the first PLAU is PDLAU, the second PLAU is PLLAU.

It has been found that the presence of this second PLAU leads to a decreased set time, which is advantageous in may applications.

In this embodiment of the invention, the second PLAU is present in an amount of 0.5-20 wt. % of the first PLAU. If the amount of second PLAU is below 0.5 wt. %, the decrease in set time of the composition generally not be obtained. On the other hand, if the amount of second PLAU is above 20 wt. %, its presence may start to interfere with the properties of the composition resulting, e.g., in a low-shear viscosity which is too high.

It may be preferred for the second PLAU to be present in an amount of 1-10 wt. %, more preferably 2-8 wt. % and most preferably 3-6 wt %, of the first PLAU.

The first PLAU is PLLAU or PDLAU, with the second PLAU having the opposite stereochemistry. While both PLLAU and PDLAU are viable options for the first PLAU from a technical point of view, it may be preferred for the first PLAU to be PLLAU and the second PLAU to be PDLAU. This is because PLLA is derived from L-lactic acid, which is has a higher availability on the market than D-lactic acid.

Both PLA units have a number average molecular weight (Mn) of at least 0.75 kg/mol. If the Mn of either PLA unit is below this value, the effect of the present invention will not be obtained.

The first PLAU preferably has a Mn in the range of 0.75 to 10 kg/mol. When the Mn of the first PLAU is too high, it may become difficult to formulate a composition with an acceptable viscosity. On the other hand, an Mn which is higher than the lower limit of 0.75 kg/mol may help to reduce the set time of the composition. It may be preferred for the first PLAU to have an Mn in the range of 1.5 to 7.5 kg/mol, and more preferred in the range of 2.0-3.0 kg/mol, and most preferably 2.5 kg/mol.

The second PLAU, if present, preferably has a Mn in the range of 0.75 to 10 kg/mol. When the Mn of the second PLAU is too high, it may become difficult to ensure a homogeneous presence of the second PLAU in the adhesive composition. Further, the viscosity of the end product may become too high. On the other hand, an Mn which is higher than the lower limit of 0.75 kg/mol may help to reduce the set time of the composition. It may be preferred for the second PLAU to have an Mn in the range of 1.5 to 7.5 kg/mol and more preferred in the range of 2.5-4.0 kg/mol, most preferably 3.5 kg/mol.

In one embodiment it is preferred for the values of the Mn of the first and the second PLAU in the adhesive to be in the same range. More precisely, it is preferred for the Mn of the largest PLAU to be at most 2.5 kg/mol larger than the Mn of the smallest PLAU, in particular at most 2.0 kg/mol. It may be preferred for the Mn of the largest PLAU to be at most 1.5 kg/mol larger than the Mn of the smallest PLAU. It has appeared that matching the molecular weights of the two types of PLAU in this manner helps to ensure that the composition has an adequate viscosity.

Within the context of the present specification, the number average molecular weight Mn is the statistical average molecular weight of all the polymer chains in the sample, and is defined by:

$$Mn = \frac{\Sigma NiMi}{\Sigma Ni}$$

where Mi is the molecular weight of a chain and Ni is the number of chains of that molecular weight. Mn can be predicted by polymerization mechanisms and is measured by methods that determine the number of molecules in a sample of a given weight; for example, colligative methods such as end-group assay. If Mn is quoted for a molecular weight distribution, there are equal numbers of molecules on either side of Mn in the distribution. In the context of the present specification Mn is determined by Relative Gel permeation chromatography (GPC) using chloroform as solvent and running phase, using polystyrene as a reference. Detection is via Refractive Index.

The PLA units used in the composition according to the invention may be in the form of, respectively PLLA and PDLA polymers. It is also possible, however, that the units are present in polymers which also encompass other units. For example, a PLLA unit can be present as a block in a polymer which also comprises blocks of lactic acid polymer which contains less than 90% of units of a single type of stereochemistry. An example of such a block would be a block obtained by polymerization of meso-lactide (which contains 50% L-lactic acid monomer and 50% D-lactic acid monomer). In general, the PLAU is present in a polymer which comprises at least 70 wt. % of monomers derived from lactic acid, either in the PLAU or in the polymer but not in the PLAU. It may be preferred for the PLAU to be present in a polymer which comprises at least 80 wt. % of monomers derived from lactic acid, in particular at least 90 wt. %. It is noted that in the context of the present specification the polymer comprising the PLAU and the amorphous thermoplastic resin are separate components.

In one embodiment, the PLAU is present in a polymer of which it makes up at least 80 wt. %, in particular at least 90 wt. %.

In general, the first PLAU and the second PLAU, if present, are present in different polymers, as it is believed that this makes the adhesive composition easier to manufacture and allows more flexibility in tuning the composition to meet specific needs for the end composition.

The non-reactive hot-melt adhesive according to the invention comprises an amorphous thermoplastic resin which is a random copolymer of lactic acid, preferably derived from lactide, and one or more further reactive monomers.

Within the context of the present specification an amorphous thermoplastic resin is defined as a thermoplastic resin which has an enthalphy of melting of at most 2.0 J/gram. This is determined via DSC.

It is preferred for the amorphous thermoplastic resin to have an enthalpy of melting of at most 1.0 J/gram, as a lower degree of crystallinity, as is evidenced from a lower enthalpy of melting, is believed to prevent the adhesive from becoming brittle and to result in a hot-melt adhesive with better adhesion properties.

Within the context of the present specification, the term thermoplastic polymer refers to a polymer which is solid at room temperature, becomes pliable, moldable, or liquid above a specific temperature, and returns to the solid state below said temperature, and wherein these heating and cooling steps can be repeated.

Within the context of the present specification, the term "compatible with polylactic acid" means that a mixture of the amorphous thermoplastic resin and the PLA units as they will occur in the hot-melt adhesive is stable both under melting conditions and at room temperature. Stable means that upon storage at room temperature for 30 days and under melting conditions for 72 hours no phase separation occurs and the emulsion or suspension remains homogeneous.

It is within the scope of the skilled person to determine whether the thermoplastic polymer is compatible with polylactic acid by simple tests, e.g., by placing an amount, e.g., 50 ml of the adhesive composition in a glass jar in an oven at a temperature above the melting temperature (without stirring), and visually assessing the properties of the product. The temperature used in the test should correspond to a temperature at which the adhesive may be used in commercial operation.

The amorphous thermoplastic resin generally has a Mn in the range of 10 to 100 kg/mol, depending on the nature of the resin. If the molecular weight is too low, the adhesive properties of the adhesive composition may be unacceptable.

If the molecular weight is too high, the viscosity of the composition may be unacceptably high. It may be preferred for the Mn to be in the range of 10 to 50 kg/mol, in particular in the range of 10 to 30 kg/mol, and most particular approximately 15 kg/mol.

The respective amounts of thermoplastic polymer and PLA units may vary within wide ranges. In one embodiment, the non-reactive hot-melt adhesive of the invention comprises 20-80 wt. %, in particular 30-70 wt. %, calculated on the weight of the adhesive, of amorphous thermoplastic resin and 20-80 wt. %, in particular 30-70 wt. %, calculated on the weight of the adhesive, of the total of first and second PLA units.

In some embodiments, it may be preferred for the non-reactive hot-melt adhesive of the invention to comprises 40-60 wt. %, calculated on the weight of the adhesive, of amorphous thermoplastic resin and 40-60 wt. %, calculated on the weight of the adhesive, of the total of first and second PLA units.

In the present invention, the amorphous thermoplastic resin is a random copolymer of lactic acid and further reactive monomer. The random copolymer has an enthalpy of melting of at most 2.0 J/g, as specified above.

Within the context of the present specification further reactive monomer is defined as a monomer which is not a lactic acid monomer and which is capable of polymerizing with lactic acid monomers (generally in the form of lactide) to form a polymer.

Suitable further reactive monomers may be selected from monomers having a single alcohol group and a single carboxylic acid group. Representative examples of such monomers are glycolic acid (often in the form of glycolide, the cyclic diester of glycolic acid), lactones, and mandelic acid.

Interesting further reactive monomers may be selected from monomers having two alcohol groups in combination with monomers having two carboxylic acid groups. These two monomers should be combined in approximately a 1:1 molecular ratio, e.g., between 0.8:1 and 1.2:1, whereby a slight excess of the dialcohol monomer is preferred. Therefore, in one embodiment the molar ratio between diol and dicarboxylic acid is in the range of above 1:1 to 1.2:1, in particular above 1:1 to 1.1:1.

Examples of suitable monomers having two hydroxyl groups are ethane diols, propane diols, butane diols, pentane diols such as neopentyl glycol, and hexane diols, ethylene glycol, diethylene glycol, and triethylene glycol.

Examples of suitable dicarboxylic acids are succinic acid, fumaric acid, adipic acid, maleic acid, 2,5-furandicarboxylic acid, and malic acid.

In general, the reactive monomer has between 2 and 20 carbon atoms (C2-C20), more specifically between 2 and 10 carbon atoms (C2-C10). In all cases, the C-chains may be straight or branched and include also other suitable substituents.

At this point in time copolymers of lactic acid (generally derived from lactide), and one or more further reactive monomers selected from the group of glycolic acid (often in the form of glycolide, the cyclic diester of glycolic acid), lactones, in particular caprolactone, and mandelic acid are considered preferred. The use of a copolymer of lactic acid and caprolactone as further reactive monomer is considered particularly preferred. This embodiment is discussed in more detail below.

Combinations of two or more polymers may also be used.

The random copolymer of lactic acid and further reactive monomer generally comprises 10-90 wt. % of lactic acid monomer and 90-10 wt. % of further reactive monomers. It may be preferred for the random copolymer to comprise at least 20 wt. % of lactic acid monomer, in particular at least 40 wt. % of lactic acid monomer, in some embodiments at least 50 wt. % of lactic acid monomer. In one embodiment the polymer comprises at most 80 wt. % of lactic acid monomer. The balance is always made up of further reactive monomer.

The lactic acid monomers that are present in the thermoplastic resin used in the present invention can be derived from D-lactic acid, L-lactic acid, and combinations thereof. The use of L-lactic acid may be preferred in view of its wide availability.

In one embodiment the amorphous thermoplastic resin is a copolymer of lactic acid and caprolactone as further reactive monomer.

The general ranges indicated above for the random copolymer of lactic acid and further reactive monomer also apply to this copolymer of lactic acid and caprolactone. For this specific copolymer is it preferred for it to comprise 40-80 wt. % of lactic acid monomer, in particular L-lactic acid monomer, and 60-20 wt. % of caprolactone. It is considered particularly preferred for this copolymer to comprise 50-70 wt. % of lactic acid monomer, in particular L-lactic acid monomer, and the balance caprolactone.

As regards the molecular weight: while the general ranges indicated above for the amorphous thermoplastic resin also apply to this specific copolymer, it may be preferred for the copolymer of lactic acid monomer and caprolactone to have a Mn in the range of 10 to 50 kg/mol, in particular 10-40 kg/mol.

While the general ranges given above also apply, where a copolymer of caprolactone and lactic acid is used in the present invention, it is preferred for the non-reactive hot-melt adhesive of the invention to comprise 40-60 wt. %, calculated on the weight of the adhesive, of amorphous thermoplastic resin and 40-60 wt. %, calculated on the weight of the adhesive, of first and, if present, second PLA units.

In general, the thermoplastic resin and the polylactic acid polymer units together will make up at least 50 wt. % of the adhesive composition according to the invention. As the thermoplastic resin and the polylactic acid polymer units together provide a non-reactive hot-melt adhesive with desirable properties, it is generally preferred for the thermoplastic resin and the polylactic acid polymer units together to make up at least 60 wt. % of the adhesive composition, more in particular at least 70 wt. %, even more in particular at least 80 wt. %.

The hot-melt composition can comprise additives known in the art for addition to hot-melt adhesive compositions. Suitable additives include tackifyers which improve the adhesion properties of the composition, plasticizers to reduce the Tg of the composition, waxes to help to improve the set time and reduce the viscosity, oils to adjust the viscosity, fillers to provide volume to the composition, stabilizers such as antioxidants to increase the stability of the composition, coloring agents, rheology agents to adjust flow behavior, etc.

These components and their effects are known in the art, and require no further elucidation here.

Useful tackifiers are of the synthetic rosin resin type (with examples like Permalyn 5095® and Permalyn 5110®), the aliphatic C5/C9 resins type (with examples like Piccotac 9095-E®, Piccotac 8090-E®, Piccotac 7590®, Piccotac 6095®, Piccotac 1125® and Piccotac 5090®), the hydrogenated rosin esters type (with examples like Foralyn 5020-F®, Rosin ester, Sylvatac RE12®, Sylvatac RE 5S® and Sylvatac RE 85S®), the terpene phenolic type (with examples like Sylvares TP115P® and Sylvares TP2040HM®) and the styrenated phenolic resin type (with examples like Zonatac NG98®). Useful plasticizers are triethyl-citrate (such as in Citrofol Al Regular®), tris(2-ethylhexyl) O-acetylcitrate (such as in Citrofol AHII®), tributyl-citrate (such as in Citrofol BI), and Tributyl O-cetylcitrate ATBC (such as in Citrofol BII®). Useful waxes are paraffin wax, microcrystalline wax and synthetic wax. Useful fillers and/or rheology modifiers are chalk, barite, quartz, gypsum, calcium oxide, magnesium oxide, silica. Suitable stabilizers are anti-oxidants, such as: Irganox 1010 (Pentaerythritol Tetrakis(3-(3,5-di-tert-butyl-4-hydroxyphenyl) propionate). Suitable acid scavengers are carbodiimides.

The hot-melt adhesive of the present invention generally has a melting temperature in the range of 80-220° C., more in particular in the range of 120-200° C. If the melting temperature is too low, the adhesive may melt under conditions of use. High melting temperatures may be unattractive in view the energy consumption required and application stability.

The hot-melt adhesive of the present invention generally has a set time of less than 15 seconds, in particular less than 10 seconds. Set time may be even shorter, such as less than 8 seconds. Set time can be determined as described in Example 1.

The hot-melt adhesive of the present invention generally has a viscosity below 8000 mPa·s, preferably below 4000 mPa·s, in particular below 2000 mPa·s. The viscosity generally is above 500 mPa·s. Below 500 mPa·s, the composition may be too liquid at application temperature, which would result in "running" of the adhesive. A viscosity above 8000 mPa·s may be too high to allow easy application of the hot-melt adhesive. Viscosity can be determined in accordance with ASTM-D 3236-15, at a temperature of 175° C. using spindle 21.

The adhesive composition can be manufactured by combining the various ingredients in the liquid phase. In one embodiment, in a first step the thermoplastic resin is provided in the liquid phase, and the PLAU is added thereto, either in the solid phase or in the liquid phase, to form a liquid composition. Where both a first PLAU and a second PLAU are used, it is preferred in a first step to combine the thermoplastic resin and one of the first or second PLAU to obtain a liquid mixture, and in a second step adding other of the first or second PLAU. The latter component is preferably added in the liquid phase at relatively high temperature under mixing conditions which ensure fast mixing of the components. Most preferably, the second PLAU is first added to the thermoplastic resin. After homogenizing the resin and the second PLAU, the first PLAU is added. Adding the components in this sequence causes that the formation of lumps in the mixtures is prevented.

The invention also pertains to the use of the non-reactive hot-melt adhesive composition according to the invention to bond substrates together. The invention thus also pertains to a method for arranging substrates in a fixed position with respect to each other, comprising the steps of applying an amount of a non-reactive hot-melt adhesive composition as described above in liquid form onto a surface of a first substrate, applying a surface of a second substrate onto the amount of non-reactive hot-melt adhesive composition, and cooling the assembly of substrates and non-reactive hot-melt adhesive composition to a temperature below the melting point of the non-reactive hot-melt adhesive composition.

The hot-melt adhesive compositions of this invention are suitable for adhering a wide variety of substrates together. Suitable substrates include cardboard or paper substrates, optionally provided with a layer of a polymer coating material, e.g. a polyolefin, more preferably a polyethylene, or a polylactide. Suitable substrates also include plastics, in particular objects of, e.g., polyolefins or polylactic acid, textiles, foils used in packaging, e.g., the foils used in packaging flowers or plants, but also carpet backings. Suitable substrates further include metal foils and wood.

In one embodiment, the substrates are part of a package.

Due to its biodegradability the adhesive composition according to the invention, especially where the thermoplastic resin is the copolymer of lactic acid and caprolactone described above, is particularly attractive for use in the adhesion of substrates which are in themselves biodegradable, e.g., cellulose-based substrates such as paper and cardboard, and biodegradable plastic substrates, such as substrates comprising polylactic acid polymers.

It will be clear to the skilled person that various embodiments of the present invention can be combined, unless they are mutually exclusive.

The present invention is illustrated by the following example, without being limited thereto or thereby.

EXAMPLE 1

Formulations where made from the following starting materials:

As thermoplastic resin a random copolymer of caprolactone and lactic acid was used, comprising 30 wt. % of caprolactone and 70 wt. % lactic acid. The copolymer had a molecular weight Mn of 15 kg/mol. The copolymer was manufactured by ring-opening polymerization of caprolactone and lactide.

As first PLAU a PLLA (initiated with cetyl alcohol) was used with a Mn of 2.5 kg/mol.

As second PLAU a PDLA (initiated with cetyl alcohol) was used with a Mn of 3.5 kg/mol.

Three compositions were prepared, namely composition A, which contained the first PLAU but not the second PLAU and compositions B and C, both of which contain the first PLAU and different amounts of second PLAU. All compositions were prepared by mixing the thermoplastic resin with the first PLAU in the liquid phase until a homogeneous mixture was obtained, followed, for compositions B and C, by the addition of the second PLAU under stirring.

The compositions were tested in an adhesive test unit as follows: A line with a length of 140 mm of the adhesive to be tested was applied at 165° C. onto a cardboard substrate. After a fixed open time of 0.5 seconds, five 25 mm sections of a second cardboard substrate were applied onto the adhesive with a contact speed of 0.5 m/s and kept at a pressure of 0.5 kg/25 mm.

After an initial assessment, the five bonds were sequentially ruptured at 1 m/s. The set time was defined as the time the bond required under pressure to ensure that upon rupture fibre tear of the cardboard substrate was obtained, while the set adhesive remained intact. Three replicate tests were made for each adhesive.

TABLE 1

| | Thermoplastic resin (wt. %) | First PLA (wt. %) | Second PLA (wt. %) | Set time (s) |
| --- | --- | --- | --- | --- |
| A | 50 | 50 | — | 7.6 |
| B | 49.5 | 49.5 | 1 | 6.7 |
| C | 48.5 | 48.5 | 3 | 4.3 |

As can be seen from Table 1, all compositions show a manageable set time. Compositions B and C, which contain both the first PLAU and the second PLAU show a lower set time than Composition A. Composition C, which has a slightly higher content of second PLAU than Composition B has a set time which is even lower.

EXAMPLE 2

Formulations where made from the following starting materials:

As thermoplastic resin a random copolymer of adipic acid (40.02 wt. %), neopentyl glycol (40.02 wt. %) and lactide (29.81 wt. %) was used. The weight percentages are calculated on the amounts of monomer before synthesis. The total of the weight percentages is above 100% due to the water removal during the esterification/polymerization reaction. The copolymer had a molecular weight Mn of 8.0 kg/mol.

As first PLAU a PLLA (initiated with cetyl alcohol) was used with a Mn of 2.5 kg/mol.

As second PLAU a PDLA (initiated with cetyl alcohol) was used with a Mn of 3.5 kg/mol.

Two compositions were prepared, namely composition D, which contained the first PLAU but not the second PLAU and composition E which contained the first PLAU and the second PLAU. The compositions were prepared and tested as described in Example 1, except that an application temperature of 160° C. was used. The results are presented in Table 2 below.

TABLE 2

| | Thermoplastic resin (wt. %) | First PLA (wt. %) | Second PLA (wt. %) | Set time (s) |
| --- | --- | --- | --- | --- |
| D | 50 | 50 | — | 8 |
| E | 48.5 | 48.5 | 3 | 6 |

As can be seen from Table 2, both compositions showed an acceptable set time, with the set time being reduced if the second PLA was added.

The invention claimed is:

1. A non-reactive hot-melt adhesive comprising
   10-90 wt. %, calculated on the weight of the adhesive, of an amorphous thermoplastic resin that is compatible with polylactic acid, wherein the amorphous thermoplastic resin is a random copolymer of lactic acid and further reactive monomer,
   10-90 wt. %, calculated on the weight of the adhesive, of a first polylactic acid polymer unit (PLAU) selected from poly-L-lactic acid (PLLAU) and poly-D-lactic acid (PDLAU), the unit having a number average molecular weight (Mn) of from 0.75 to 10 kg/mol; and
   0-20 wt. %, calculated on the weight of the first PLAU, of a second polylactic acid polymer unit (PLAU) selected from poly-L-lactic acid (PLLAU) and poly-D-lactic acid (PDLAU), the optional second PLAU having a number average molecular weight of from 0.75 to 10 kg/mol, wherein when the first PLAU is PLLAU, the second PLAU is PDLAU and when the first PLAU is PDLAU, the second PLAU is PLLAU,
   wherein the phrase "number average molecular weight (Mn)" is defined as being determined by Gel Permeation Chromatography (GPC) with chloroform as a solvent and running phase and polystyrene standard, with detection via Refractive Index, and
   wherein the phrase "amorphous thermoplastic resin" is defined as a thermoplastic resin that has an enthalpy of melting of at most 2.0 J/gram as determined by Differential Scanning calorimetry.

2. The non-reactive hot-melt adhesive according to claim 1, which further comprises 0.5-20 wt. %, calculated on the weight of the first PLAU, of the second polylactic acid polymer unit (PLAU) selected from poly-L-lactic acid (PLLAU) and poly-D-lactic acid (PDLAU), the unit having a number average molecular weight of from 0.75 to 10 kg/mol, wherein when the first PLAU is PLLAU, the second PLAU is PDLAU and when the first PLAU is PDLAU, the second PLAU is PLLAU.

3. The non-reactive hot-melt adhesive according to claim 1, wherein the first PLAU is PLLAU and wherein the second PLAU, if present, is PDLAU.

4. The non-reactive hot-melt adhesive according to claim 1, wherein the first PLAU and/or the second PLAU, if present, have a number average molecular weight in the range of 1.5 to 7.5 kg/mol.

5. The non-reactive hot-melt adhesive according to claim 1, wherein the amorphous thermoplastic resin has a number average molecular weight (Mn) in the range of 10 to 100 kg/mol.

6. The non-reactive hot-melt adhesive according to claim 1, which comprises 20-80 wt. %, calculated on the weight of the adhesive, of amorphous thermoplastic resin and 20-80 wt. %, calculated on the weight of the adhesive, of the total of the first polylactic acid polymer unit (PLAU) and, if present, the second polylactic acid polymer unit (PLAU).

7. The non-reactive hot-melt adhesive according to claim 6, which comprises 40-60 wt. %, calculated on the weight of the adhesive, of amorphous thermoplastic resin and 40-60 wt. %, calculated on the weight of the adhesive, of the total of the first polylactic acid polymer unit (PLAU) and, if present, the second polylactic acid polymer unit (PLAU).

8. The non-reactive hot-melt adhesive according to claim 1, wherein the random copolymer of lactic acid and further reactive monomer comprises 10-90 wt. % of lactic acid monomer and 90-10 wt. % of further reactive monomers.

9. The non-reactive hot-melt adhesive according to claim 1, wherein the further reactive monomer comprises caprolactone.

10. The non-reactive hot-melt adhesive according to claim 9, wherein the copolymer of lactic acid monomer and caprolactone has a number average molecular weight (Mn) in the range of 10 to 50 kg/mol, and/or the non-reactive hot-melt adhesive comprises 40-60 wt. %, calculated on the weight of the adhesive, of amorphous thermoplastic resin and 40-60 wt. %, calculated on the weight of the adhesive, of the total of the first and, if present, second PLA units.

11. The non-reactive hot-melt adhesive according to claim 1, wherein the thermoplastic resin and the polylactic acid polymer units together make up at least 50 wt. % of the adhesive.

12. A method for manufacturing a non-reactive hot-melt adhesive according to claim 1, comprising
combining and mixing, to form a liquid composition,
10-90 wt. %, calculated on the weight of the adhesive, of amorphous thermoplastic resin which is compatible with polylactic acid, wherein the amorphous thermoplastic resin is a random copolymer of lactic acid and further reactive monomer;
10-90 wt. %, calculated on the weight of the adhesive, of a first polylactic acid polymer unit (PLAU) selected from poly-L-lactic acid (PLLAU) and poly-D-lactic acid (PDLAU), the unit having a number average molecular weight (Mn) of from 0.75 to 10 kg/mol; and,
0-20 wt. %, calculated on the weight of the first PLAU, of a second polylactic acid polymer unit (PLAU) selected from poly-L-lactic acid (PLLAU) and poly-D-lactic acid (PDLAU), the optional second PLAU having a number average molecular weight of from 0.75 to 10 kg/mol, wherein when the first PLAU is PLLAU, the second PLAU is PDLAU and when the first PLAU is PDLAU, the second PLAU is PLLAU,
wherein the phrase "number average molecular weight (Mn)" is defined as being determined by Gel Permeation Chromatography (GPC) with chloroform as a solvent and running phase and polystyrene standard, with detection via Refractive Index, and
wherein the phrase "amorphous thermoplastic resin" is defined as a thermoplastic resin that has an enthalpy of melting of at most 2.0 J/gram as determined by Differential Scanning calorimetry.

13. The method according to claim 12 comprising combining and mixing in an amount of from 0.5-20 wt. %, calculated on the weight of the first PLAU, the second polylactic acid polymer unit (PLAU) to form the liquid composition,
wherein the second polylactic acid is selected from poly-L-lactic acid (PLLAU) and poly-D-lactic acid (PDLAU), the unit having a number average molecular weight of from 0.75 to 10 kg/mol, wherein when the first PLAU is PLLAU, the second PLAU is PDLAU and when the first PLAU is PDLAU, the second PLAU is PLLAU.

14. The method according to claim 13, wherein in a first step the thermoplastic resin and one of the first or second PLAU are combined to obtain a liquid mixture, and in a second step the other of the first or second PLAU is added to form a homogeneous mixture.

15. The method for arranging substrates in a fixed position with respect to each other, comprising the steps of applying an amount of a non-reactive hot-melt adhesive according to claim 1 in liquid form onto a surface of a first substrate, applying a surface of a second substrate onto the amount of non-reactive hot-melt adhesive, and cooling the assembly of substrates and non-reactive hot-melt adhesive to a temperature below the melting point of the non-reactive hot-melt adhesive.

* * * * *